US012615634B2

(12) United States Patent (10) Patent No.: US 12,615,634 B2
Lei et al. (45) Date of Patent: Apr. 28, 2026

(54) METHOD AND APPARATUS FOR DETERMINING HARQ-ACK CODEBOOK

(71) Applicant: Lenovo (Beijing) Limited, Beijing (CN)

(72) Inventors: Haipeng Lei, Haidian District (CN); Alexander Golitschek Edler von Elbwart, Darmstadt (DE)

(73) Assignee: Lenovo (Beijing) Limited, Beijing (CN)

( * ) Notice: Subject to any disclaimer, the term of this patent is extended or adjusted under 35 U.S.C. 154(b) by 771 days.

(21) Appl. No.: 17/634,038

(22) PCT Filed: Aug. 23, 2019

(86) PCT No.: PCT/CN2019/102338
§ 371 (c)(1),
(2) Date: Feb. 9, 2022

(87) PCT Pub. No.: WO2021/035437
PCT Pub. Date: Mar. 4, 2021

(65) Prior Publication Data
US 2022/0330297 A1 Oct. 13, 2022

(51) Int. Cl.
*H04W 4/00* (2018.01)
*H04L 1/08* (2006.01)
(Continued)

(52) U.S. Cl.
CPC ........... *H04W 72/1273* (2013.01); *H04L 1/08* (2013.01); *H04L 1/1642* (2013.01);
(Continued)

(58) Field of Classification Search
CPC .... H04W 72/1273; H04W 72/23; H04L 1/08; H04L 1/1642; H04L 1/1685;
(Continued)

(56) References Cited

U.S. PATENT DOCUMENTS 6,556,966 B1 * 4/2003 Gao ........................ G10L 19/08
704/E19.036
6,701,021 B1 * 3/2004 Qian ...................... G06T 9/008
382/253
(Continued)

FOREIGN PATENT DOCUMENTS

WO 2017030489 A1 2/2017
WO 2017161541 A1 9/2017

OTHER PUBLICATIONS

"International Preliminary Report on Patentability", PCT Application No. PCT/CN2019/102338, Mar. 3, 2022, 6 pages.
(Continued)

*Primary Examiner* — Amancio Gonzalez
(74) *Attorney, Agent, or Firm* — FIG. 1 Patents

(57) ABSTRACT

The present application relates to a method and apparatus for determining a HARQ-ACK codebook. One embodiment of the subject application provides a method including receiving a signal requesting transmission of Hybrid Automatic Repeat request-Acknowledgement (HARQ-ACK) feedback for both a first group of Physical Downlink Shared Channel (PDSCH) transmissions and a second group of PDSCH transmission in a HARQ-ACK codebook, wherein each PDSCH transmission of the first group of PDSCH transmissions has an associated Downlink Control Information (DCI) indicating a first group index, and each PDSCH transmission of the second group of PDSCH transmissions has an associated DCI indicating a second group index; and transmitting the HARQ-ACK codebook.

20 Claims, 8 Drawing Sheets

(51) Int. Cl.

| | |
|---|---|
| *H04L 1/1607* | (2023.01) |
| *H04L 1/1812* | (2023.01) |
| *H04L 5/00* | (2006.01) |
| *H04W 72/1273* | (2023.01) |
| *H04W 72/23* | (2023.01) |

(52) U.S. Cl.
CPC .......... *H04L 1/1685* (2013.01); *H04L 1/1812* (2013.01); *H04L 5/0053* (2013.01); *H04W 72/23* (2023.01)

(58) Field of Classification Search
CPC ... H04L 1/1812; H04L 5/0053; H04L 1/1861; H04L 1/1864; H04L 5/001; H04L 5/0044; H04L 5/0055; H04L 5/0094
USPC ........................................................ 370/329
See application file for complete search history.

(56) References Cited

U.S. PATENT DOCUMENTS

| | | | | |
|---|---|---|---|---|
| 6,714,907 | B2 * | 3/2004 | Gao | G10L 19/10 |
| | | | | 704/223 |
| 6,724,940 | B1 * | 4/2004 | Qian | H04N 19/94 |
| | | | | 382/253 |
| 7,991,610 | B2 * | 8/2011 | Sperschneider | H03M 7/40 |
| | | | | 704/211 |
| 8,125,947 | B2 * | 2/2012 | Bachl | H04W 72/20 |
| | | | | 455/450 |
| 8,665,990 | B2 * | 3/2014 | Xi | H04B 7/0456 |
| | | | | 455/515 |
| 8,750,404 | B2 * | 6/2014 | Gomadam | H04B 7/065 |
| | | | | 375/267 |
| 8,873,664 | B2 * | 10/2014 | Lee | H04B 7/0641 |
| | | | | 375/267 |
| 8,953,522 | B2 * | 2/2015 | Han | H04L 1/0031 |
| | | | | 370/328 |
| 9,674,749 | B2 * | 6/2017 | Jeong | H04W 76/12 |
| 10,298,363 | B2 * | 5/2019 | Jung | H04L 1/0045 |
| 10,342,005 | B2 * | 7/2019 | Song | H04L 5/0094 |
| 10,484,060 | B2 * | 11/2019 | Noh | H04B 7/0486 |
| 10,541,785 | B2 * | 1/2020 | Papasakellariou | H04L 1/1812 |
| 10,660,066 | B2 * | 5/2020 | Shi | H04W 52/0209 |
| 10,813,118 | B2 * | 10/2020 | Park | H04L 5/00 |
| 10,855,407 | B2 * | 12/2020 | Xiong | H04L 1/1874 |
| 10,856,307 | B2 * | 12/2020 | Park | H04W 72/12 |
| 10,868,587 | B2 * | 12/2020 | Zhao | H04B 7/0413 |
| 10,868,595 | B2 * | 12/2020 | Nam | H04B 7/0482 |
| 10,904,869 | B2 * | 1/2021 | Nayeb Nazar | H04L 1/0057 |
| 10,966,236 | B2 * | 3/2021 | Xiong | H04L 5/0094 |
| 11,057,245 | B2 * | 7/2021 | Zhao | H04L 5/14 |
| 11,108,473 | B2 * | 8/2021 | Ng | H04B 7/088 |
| 11,121,824 | B2 * | 9/2021 | Papasakellariou | H04L 5/0055 |
| 11,160,138 | B2 * | 10/2021 | Haustein | H04B 7/0697 |
| 11,171,745 | B2 * | 11/2021 | Khoshnevisan | H04L 1/1621 |
| 11,172,495 | B2 * | 11/2021 | Hosseini | H04L 47/41 |
| 11,190,254 | B2 * | 11/2021 | Kang | H04L 5/0057 |
| 11,190,324 | B2 * | 11/2021 | Korhonen | H04L 1/1861 |
| 11,258,544 | B2 * | 2/2022 | Wang | H04L 1/1896 |
| 11,336,403 | B2 * | 5/2022 | Tsai | H04L 1/1812 |
| 11,343,024 | B2 * | 5/2022 | Yin | H04L 5/0055 |
| 11,349,614 | B2 * | 5/2022 | Karaki | H04L 5/0055 |
| 11,368,257 | B2 * | 6/2022 | Kim | H04W 72/0446 |
| 11,445,536 | B2 * | 9/2022 | Li | H04L 5/00 |
| 11,476,996 | B2 * | 10/2022 | Lin | H04L 1/1614 |
| 11,489,635 | B2 * | 11/2022 | Lei | H04W 72/0446 |
| 11,539,472 | B2 * | 12/2022 | Karaki | H04L 1/1822 |
| 11,546,090 | B2 * | 1/2023 | Babaei | H04L 1/1812 |
| 11,563,545 | B2 * | 1/2023 | Li | H04L 5/001 |
| 11,632,195 | B2 * | 4/2023 | Salem | H04L 1/1854 |
| | | | | 370/329 |
| 11,646,834 | B2 * | 5/2023 | Wang | H04L 5/0055 |
| | | | | 370/329 |
| 11,696,299 | B2 * | 7/2023 | Elshafie | H04W 72/23 |
| | | | | 370/329 |
| 11,711,192 | B2 * | 7/2023 | Papasakellariou | H04L 1/1861 |
| | | | | 370/329 |
| 11,832,283 | B2 * | 11/2023 | Khoshnevisan | H04W 80/02 |
| 11,864,198 | B2 * | 1/2024 | Yoshimura | H04L 1/1861 |
| 11,979,233 | B2 * | 5/2024 | Kim | H04L 1/0067 |
| 12,003,338 | B2 * | 6/2024 | Falahati | H04L 5/0055 |
| 12,022,481 | B2 * | 6/2024 | Yang | H04L 5/0053 |
| 12,126,570 | B2 * | 10/2024 | Marinier | H04L 1/003 |
| 12,177,028 | B2 * | 12/2024 | Li | H04L 1/1861 |
| 2015/0043434 | A1 * | 2/2015 | Yamada | H04W 72/0446 |
| | | | | 370/329 |
| 2015/0163792 | A1 * | 6/2015 | Gomadam | H04B 7/0456 |
| | | | | 370/336 |
| 2017/0134140 | A1 | 5/2017 | Park | |
| 2018/0279326 | A1 * | 9/2018 | Park | H04L 5/0096 |
| 2020/0008229 | A1 * | 1/2020 | Li | H04L 1/0027 |
| 2020/0313807 | A1 * | 10/2020 | Salem | H04L 1/1607 |
| 2021/0050948 | A1 * | 2/2021 | Gao | H04L 1/1812 |
| 2021/0051650 | A1 * | 2/2021 | Yi | H04W 72/21 |
| 2021/0243767 | A1 * | 8/2021 | Suzuki | H04L 5/0007 |
| 2021/0306109 | A1 * | 9/2021 | Li | H04L 27/2601 |
| 2021/0377912 | A1 * | 12/2021 | El Hamss | H04L 1/1861 |
| 2022/0061074 | A1 * | 2/2022 | Babaei | H04L 5/0053 |
| 2022/0150011 | A1 * | 5/2022 | Kim | H04L 1/00 |
| 2022/0190980 | A1 * | 6/2022 | Matsumura | H04L 5/0032 |
| 2022/0225390 | A1 * | 7/2022 | Harada | H04L 1/1685 |
| 2022/0255669 | A1 * | 8/2022 | Yin | H04W 72/21 |
| 2022/0322405 | A1 * | 10/2022 | Elshafie | H04L 5/0094 |
| 2022/0416953 | A1 * | 12/2022 | Li | H04L 1/1896 |
| 2024/0023135 | A1 * | 1/2024 | Ye | H04L 1/1822 |
| 2024/0306159 | A1 * | 9/2024 | Yang | H04L 1/1864 |

OTHER PUBLICATIONS

"International Search Report and Written Opinion", PCT Application No. PCT/CN2019/102338, May 14, 2020, 8 pages.

Alcatel-Lucent Shanghai Bell , et al., "HARQ Bundling with Layer Shifting for LTE-Advanced Uplink SU-MIMO", 3GPP TSG RAN WG1 Meeting #57, R1-092163, San Francisco, CA, USA, May 2009, 5 pages.

HUAWEI , "Feature lead summary of HARQ enhancements for NR-U", 3GPP TSG RAN WG1 Meeting #96bis, R1-1905649, Xi'an, China, Apr. 2019, 29 pages.

Zhang, Mai , et al., "Optimizing HARQ Feedback and Incremental Redundancy in Wireless Communications", 2018 IEEE Wireless Communications and Networking Conference (WCNC) [retrieved May, 3, 2022]. Retrieved from the Internet <https://engineering.purdue.edu/~bpeleato/OptHARQ.pdf>., Apr. 2018, 6 pages.

19942905.1 , "Extended European Search Report", EP Application No. 19942905.1, Mar. 31, 2023, 7 pages.

HUAWEI , "Feature lead summary of HARQ enhancements for NR-U", 3GPP TSG RAN WG1 Meeting #97, R1-1907652, Reno, USA [retrieved Apr. 19, 2023]. Retrieved from the Internet <https://www.3gpp.org/ftp/tsg_ran/WG1_RL1/TSGR1_97/Docs>, May 2019, 22 pages.

VIVO , "Discussion on HARQ operation for NR-U", 3GPP TSG RAN WG1#98, R1-1908142, Prague, CZ [retrieved Apr. 19, 2023]. Retrieved from the Internet <https://www.3gpp.org/ftp/TSG_RAN/WG1_RL1/TSGR1_98/Docs/>, Aug. 2019. 9 pages.

* cited by examiner 601    receiving a signal requesting transmission of HARQ-ACK feedback for both a first group of PDSCH transmissions and a second group of PDSCH transmission in a HARQ-ACK codebook 602    transmitting the HARQ-ACK codebook

701

702

METHOD AND APPARATUS FOR DETERMINING HARQ-ACK CODEBOOK

TECHNICAL FIELD

The subject application relates to relates to Generation Partnership Project (3GPP) 5G new radio (NR), especially to a method and apparatus for determining a HARQ-ACK codebook.

BACKGROUND OF THE INVENTION

For dynamic Hybrid Automatic Repeat request (HARQ) codebook, Physical Downlink Shared Channel (PDSCH) grouping is explicitly indicated by a Group Index (GI) in Downlink Control Information (DCI) scheduling the PDSCH and a Base Station (BS) can request Hybrid Automatic Repeat request-Acknowledgement (HARQ-ACK) feedback for all PDSCHs in the same PDSCH group or in different PDSCH groups in the same Physical Uplink Control Channel (PUCCH). If the UE fails to transmit the PUCCH carrying the HARQ-ACK codebook to the BS, or the BS incorrectly decodes the PUCCH carrying the HARQ-ACK codebook, the BS would request the UE to retransmit the HARQ-ACK codebook in a subsequent slot, together with the HARQ-ACK feedback corresponding to newly scheduled PDSCHs.

The combination of HARQ-ACK feedback for one or more PDSCH groups in the same HARQ-ACK codebook may cause the size of the HARQ-ACK codebook extremely large. Accordingly, it is desirable to reduce the size of the HARQ-ACK codebook.

SUMMARY

It is desirable to provide a solution to reduce the size of the HARQ-ACK codebook.

One embodiment of the subject application provides a method including receiving a signal requesting transmission of Hybrid Automatic Repeat request-Acknowledgement (HARQ-ACK) feedback for both a first group of Physical Downlink Shared Channel (PDSCH) transmissions and a second group of PDSCH transmission in a HARQ-ACK codebook, wherein each PDSCH transmission of the first group of PDSCH transmissions has an associated Downlink Control Information (DCI) indicating a first group index, and each PDSCH transmission of the second group of PDSCH transmissions has an associated DCI indicating a second group index; and transmitting the HARQ-ACK codebook.

Another embodiment of the subject application provides a method including transmitting a signal requesting transmission of Hybrid Automatic Repeat request-Acknowledgement (HARQ-ACK) feedback for both a first group of Physical Downlink Shared Channel (PDSCH) transmissions and a second group of PDSCH transmission in a HARQ-ACK codebook, wherein each PDSCH transmission of the first group of PDSCH transmissions has associated an Downlink Control Information (DCI) indicating a first group index, and each PDSCH transmission of the second group of PDSCH transmissions has an associated DCI indicating a second group index; and receiving the HARQ-ACK codebook.

Yet another embodiment of the subject application provides an apparatus, including: a non-transitory computer-readable medium having stored thereon computer-executable instructions; a receiving circuitry; a transmitting circuitry; and a processor coupled to the non-transitory computer-readable medium, the receiving circuitry and the transmitting circuitry, wherein the computer-executable instructions cause the processor to implement the method including receiving a signal requesting transmission of Hybrid Automatic Repeat request-Acknowledgement (HARQ-ACK) feedback for both a first group of Physical Downlink Shared Channel (PDSCH) transmissions and a second group of PDSCH transmission in a HARQ-ACK codebook, wherein each PDSCH transmission of the first group of PDSCH transmissions has an associated Downlink Control Information (DCI) indicating a first group index, and each PDSCH transmission of the second group of PDSCH transmissions has an associated DCI indicating a second group index; and transmitting the HARQ-ACK codebook.

Still another embodiment of the subject application provides an apparatus, including: a non-transitory computer-readable medium having stored thereon computer-executable instructions; a receiving circuitry; a transmitting circuitry; and a processor coupled to the non-transitory computer-readable medium, the receiving circuitry and the transmitting circuitry, wherein the computer-executable instructions cause the processor to implement the method including transmitting a signal requesting transmission of Hybrid Automatic Repeat request-Acknowledgement (HARQ-ACK) feedback for both a first group of Physical Downlink Shared Channel (PDSCH) transmissions and a second group of PDSCH transmission in a HARQ-ACK codebook, wherein each PDSCH transmission of the first group of PDSCH transmissions has associated an Downlink Control Information (DCI) indicating a first group index, and each PDSCH transmission of the second group of PDSCH transmissions has an associated DCI indicating a second group index; and receiving the HARQ-ACK codebook.

DETAILED DESCRIPTION

The detailed description of the appended drawings is intended as a description of the currently preferred embodiments of the present invention, and is not intended to represent the only form in which the present invention may be practiced. It should be understood that the same or equivalent functions may be accomplished by different embodiments that are intended to be encompassed within the spirit and scope of the present invention.

Embodiments provide a method and apparatus for downlink (DL) or uplink (UL) data transmission on unlicensed spectrum. To facilitate understanding, embodiments are provided under specific network architecture and new service scenarios, such as 3GPP 5G, 3GPP LTE Release 8 and so on. Persons skilled in the art know very well that, with the development of network architecture and new service scenarios, the embodiments in the present disclosure are also applicable to similar technical problems.

Figure 1:
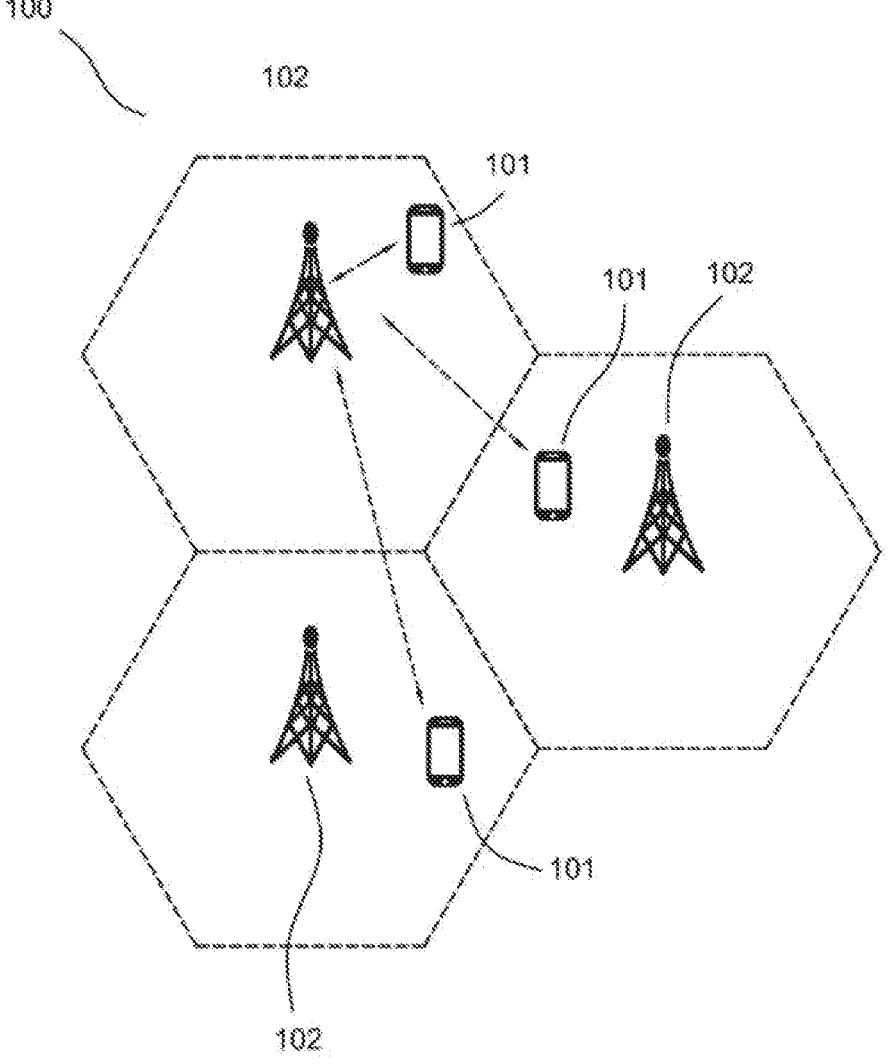
FIG. 1 illustrates a schematic diagram of a wireless communication system in accordance with some embodiments of the present application.

FIG. 1 illustrates a wireless communication system 100 according to an embodiment of the present disclosure.

As shown in FIG. 1, the wireless communication system 100 includes UE 101 and BS 102. In particular, the wireless communication system 100 includes three UEs 101 and three BSs 102 for illustrative purpose only. Even though a specific number of UEs 101 and BSs 102 are depicted in FIG. 1, one skilled in the art will recognize that any number of UEs 101 and BSs 102 may be included in the wireless communication system 100.

The UEs 101 may include computing devices, such as desktop computers, laptop computers, personal digital assistants (PDAs), tablet computers, smart televisions (e.g., televisions connected to the Internet), set-top boxes, game consoles, security systems (including security cameras), vehicle on-board computers, network devices (e.g., routers, switches, and modems), or the like. According to an embodiment of the present disclosure, the UEs 101 may include a portable wireless communication device, a smart phone, a cellular telephone, a flip phone, a device having a subscriber identity module, a personal computer, a selective call receiver, or any other device that is capable of sending and receiving communication signals on a wireless network. In some embodiments, the UEs 101 include wearable devices, such as smart watches, fitness bands, optical head-mounted displays, or the like. Moreover, the UEs 101 may be referred to as a subscriber unit, a mobile, a mobile station, a user, a terminal, a mobile terminal, a wireless terminal, a fixed terminal, a subscriber station, a user terminal, or a device, or described using other terminology used in the art. The UEs 101 may communicate directly with the BSs 102 via uplink (UL) communication signals.

The BSs 102 may be distributed over a geographic region. In certain embodiments, each of the BSs 102 may also be referred to as an access point, an access terminal, a base, a macro cell, a Node-B, an enhanced Node B (eNB), a gNB, a Home Node-B, a relay node, or a device, or described using other terminology used in the art. The BSs 102 are generally part of a radio access network that may include one or more controllers communicably coupled to one or more corresponding BSs 102.

The wireless communication system 100 is compatible with any type of network that is capable of sending and receiving wireless communication signals. For example, the wireless communication system 100 is compatible with a wireless communication network, a cellular telephone network, a Time Division Multiple Access (TDMA)-based network, a Code Division Multiple Access (CDMA)-based network, an Orthogonal Frequency Division Multiple Access (OFDMA)-based network, an LTE network, a 3rd Generation Partnership Project (3GPP)-based network, a 3GPP 5G network, a satellite communications network, a high altitude platform network, and/or other communications networks.

In one embodiment, the wireless communication system 100 is compatible with the 5G new radio (NR) of the 3GPP protocol, wherein the BSs 102 transmit data using an orthogonal frequency division multiplexing (OFDM) modulation scheme on the downlink and the UEs 101 transmit data on the uplink using Discrete Fourier Transform-Spread-Orthogonal Frequency Division Multiplexing (DFT-S-OFDM) or Cyclic Prefix-Orthogonal Frequency Division Multiplexing (CP-OFDM) scheme. More generally, however, the wireless communication system 100 may implement some other open or proprietary communication protocols, for example, WiMAX, among other protocols.

In other embodiments, the BSs 102 may communicate using other communication protocols, such as the IEEE 802.11 family of wireless communication protocols. Further, in some embodiments, the BSs 102 may communicate over licensed spectrums, whereas in other embodiments the BSs 102 may communicate over unlicensed spectrums. The present disclosure is not intended to be limited to the implementation of any particular wireless communication system architecture or protocol. In another embodiment, the BSs 102 may communicate with the UEs 101 using the 3GPP 5G protocols.

For dynamic HARQ codebook, PDSCH grouping is explicitly indicated by a GI in DCI which schedules the PDSCH. The BSs 102 may transmit the DCI to request HARQ-ACK feedback for all PDSCHs in one or more PDSCH groups in the same PUCCH. In this disclosure, we focus on two situations, the first one is the BS request HARQ-ACK feedback for all PDSCHs in the same PDSCH group in the same PUCCH; and the second one is the BS request HARQ-ACK feedback for all PDSCHs in different groups in the same PUCCH.

Regarding the situation that the BS requests HARQ-ACK feedback for all PDSCHs in the same PDSCH group in the same PUCCH, due to the possibility of newly scheduled PDSCHs with same GI, the number of PDSCHs in same group is increased with the PDSCHs in previous transmission and newly scheduled PDSCHs. As a result, the number of HARQ-ACK bits for one PDSCH group is changed between successive requests for HARQ-ACK feedback for the same PDSCH group.

Figure 2:
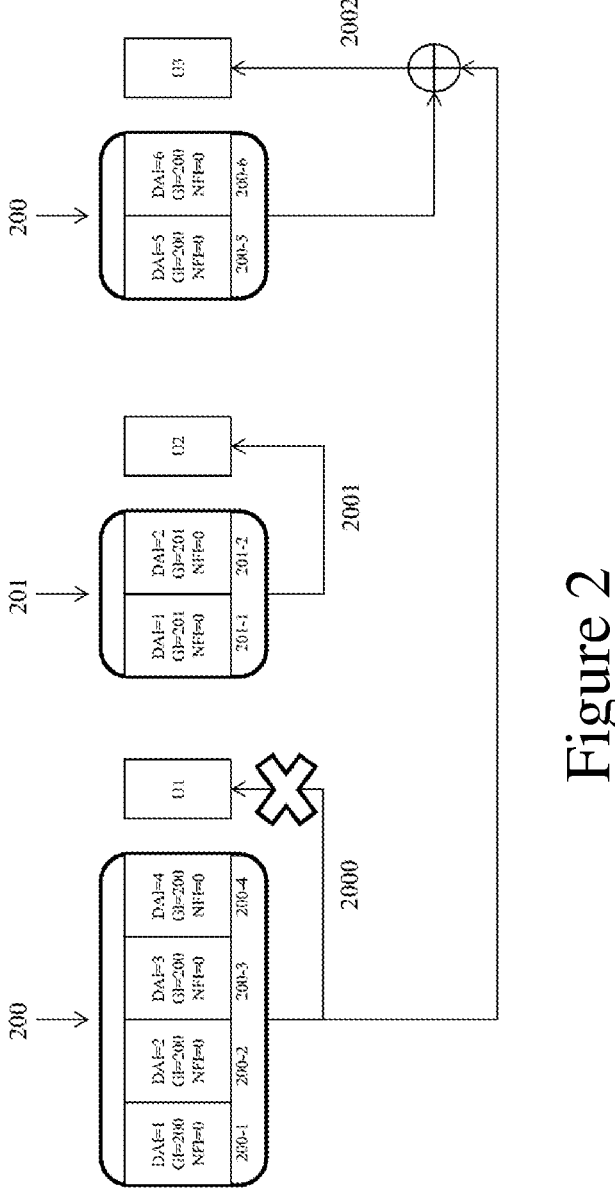
FIG. 2 illustrates one HARQ-ACK codebook determination for the same PDSCH group in one PUCCH.

FIG. 2 illustrates one HARQ-ACK codebook determination for the same PDSCH group in one PUCCH.

In FIG. 2, the PDSCH group 200 includes four PDSCHs, PDSCH 200-1, PDSCH 200-2, PDSCH 200-3 and PDSCH 200-4, each PDSCH in the PDSCH group 200 is indicated by the group index 200, and has the associated counter DAI (C-DAI) 1, 2, 3, and 4, respectively. For example, the value of the C-DAI of PDSCH 200-1 is 1, the value of GI is 200, and the value of New Feedback Indicator (NFI) is 0. The PUCCH which carries the HARQ-ACK codebook 2000 corresponding to the four PDSCHs is transmitted in slot U1.

FIG. 2 also depicts a PDSCH group 201, which includes two PDSCHs, PDSCH 201-1 and PDSCH 201-2. Each PDSCH in the PDSCH group 201 is indicated by the group index 201, and the values of the associated C-DAI are 1 and 2, respectively. The PUCCH which carries the HARQ-ACK codebook 2001 corresponding to the two PDSCHs is transmitted in slot U2.

If the UE fails to transmit the PUCCH carrying the HARQ-ACK codebook 2000 to the BS due to Listen Before Talk (LBT) failure, or the BS incorrectly decodes the PUCCH carrying the HARQ-ACK codebook 2000 due to interference, for example, hidden node interference, the BS would request the UE to retransmit the HARQ-ACK codebook 2000 in a subsequent slot, e.g., slot U3, together with the HARQ-ACK feedback corresponding to two newly scheduled PDSCHs, e.g., PDSCH 200-5 and PDSCH 200-6 in the PDSCH group 200. In FIG. 2, the GI of PDSCH 200-5 is 200, the value of the associated DAI for PDSCH 200-5 is 5, the NFI of PDSCH 200-5 is 0, the GI of PDSCH 200-6 is 200, the value of the associated DAI for PDSCH 200-6 is 6, and the NFI of PDSCH 200-6 is 0.

Therefore, the value of the GI for the PDSCH 200-1, 200-2, 200-3, and 200-4 and the value of the GI for the PDSCH 200-5 and 200-6 are identical, the value of the NFI of the PDSCH 200-1, 200-2, 200-3, and 200-4 and the value of the NFI of the PDSCH 200-5 and 200-6 are non-toggled, and the value of the DAI follows the DAI associated with the last PDSCH in same group 200.

Based on the same PDSCH group index, non-toggled NFI and updated DAI following the DAI associated with the last PDSCH in the same group, UE knows the retransmission of HARQ-ACK codebook 2000 corresponding to four PDSCHs in the same PDSCH group is requested. Hence, from the UE's perspective, PDSCH group 200 should be updated by including the newly scheduled PDSCHs, PDSCH 200-5 and 200-6, and previously transmitted PDSCHs, 200-1, 200-2, 200-3, and 200-4, in the same PDSCH group. Accordingly, UE shall generate a new HARQ-ACK codebook 2002 including HARQ-ACK feedback for PDSCH 200-1, PDSCH 200-2, PDSCH 200-3, PDSCH 200-4, PDSCH 200-5 and PDSCH 200-6, for PDSCH group 200, and transmit the new HARQ-ACK codebook 2002 in one PUCCH in slot U3.

Needless to say, due to retransmission of HARQ-ACK feedback for previous PDSCHs, the size of PDSCH group 200 is increased. The size of the HARQ-ACK codebook 2002 for PDSCH group 200 is also increased because of successive requests for HARQ-ACK feedback. As shown in FIG. 2, without consideration of DL two-codeword transmission, carrier aggregation, and CBG-based retransmission, the size of the HARQ-ACK codebook 2000 is 4 for previous PDSCH group 200, and the size of the HARQ-ACK codebook 2002 is 6 for new PDSCH group 200. If the UE still fails to transmit the PUCCH carrying the HARQ-ACK codebook 2002 to the BS due to Listen Before Talk (LBT) failure, or the BS still incorrectly decodes the PUCCH carrying the HARQ-ACK codebook 2002 due to interference, then the size of the PDSCH group might be further increased.

Furthermore, if the RRC signaling of maximum number of codewords scheduled by the DCI indicates reception of two transport blocks (TBs), and if maximum M Code Block Groups (CBGs) per TB are configured for CBG-based retransmission, assuming there are $N_1$ PDSCHs scheduled in previous PDSCH group 200, then the HARQ-ACK codebook size for previous PDSCH group 200 is equal to $2 \times N_1 \times M$; assuming there are $N_2$ PDSCHs newly scheduled in current PDSCH group 200, then the HARQ-ACK codebook size for the new PDSCH group 200 is equal to $2 \times (N_1 + N_2) \times M$. Considering the carrier aggregation, the value of $N_1$ and $N_2$ count the total number of PDSCHs scheduled in one PDSCH group, which renders the size of the HARQ-ACK codebook extremely huge. For instance, setting M to 4, maximum 2 TBs scheduled by one DCI, $N_1 = 20$, $N_2 = 8$, then the size of the final codebook size is $2 \times (20+8) \times 4 = 28 \times 8 = 224$. So solutions are needed to avoid the huge size of the HARQ-ACK codebook for the situation that the BS requests HARQ-ACK feedback for all PDSCHs in the same PDSCH group in the same PUCCH.

Figure 3:
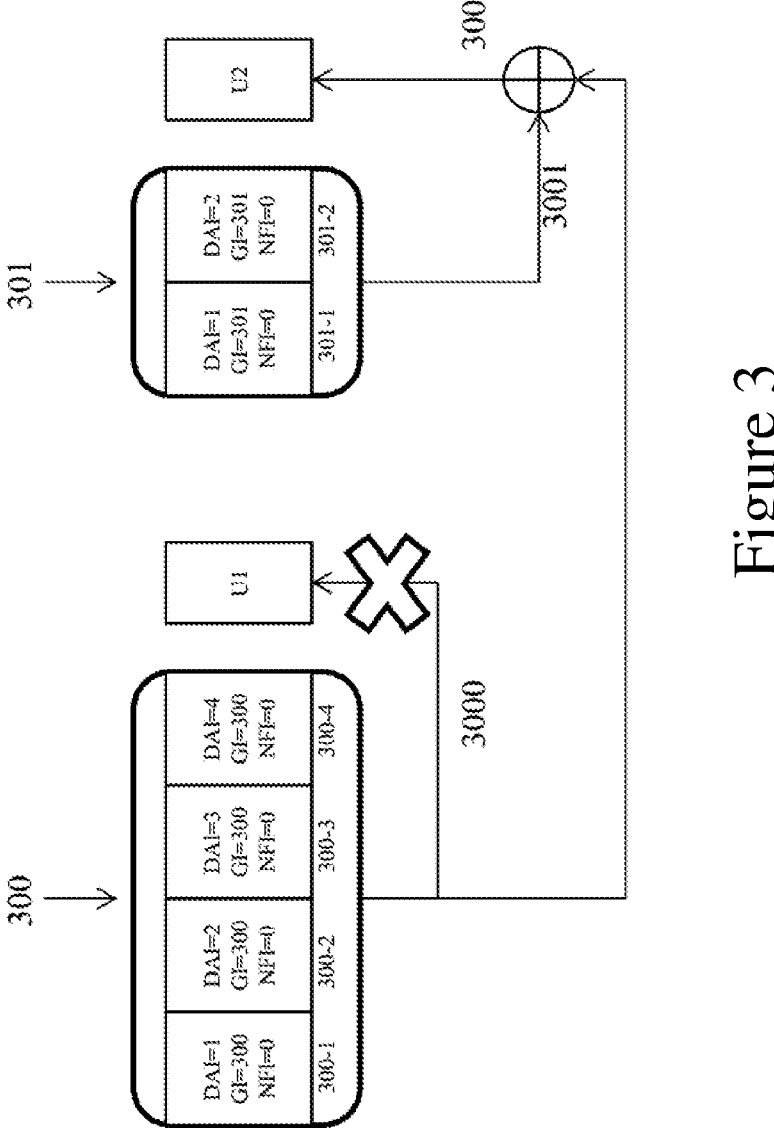
FIG. 3 illustrates one HARQ-ACK codebook determination for two PDSCH groups in one PUCCH.

Regarding the situation that the BS requests HARQ-ACK feedback for all PDSCHs in the different PDSCH group in the same PUCCH, FIG. 3 illustrates one HARQ-ACK codebook determination for two PDSCH groups in one PUCCH. According to the present agreement, one DCI can request HARQ-ACK feedback for one or more PDSCH groups in the same PUCCH. As shown in FIG. 3, assuming the transmission of HARQ-ACK codebook 3000 for PDSCH group 300 is failed, when the BS schedules PDSCH transmission for PDSCH group 301, the BS can request the retransmission of the HARQ-ACK feedback for PDSCH group 300 together with the initial transmission of HARQ-ACK feedback for PDSCH group 301 in the same HARQ-ACK codebook 3002. As explained above, the combination of HARQ-ACK feedback for two PDSCH groups in the same HARQ-ACK codebook may cause huge HARQ-ACK codebook size. So solutions are also needed to avoid the huge size of the HARQ-ACK codebook.

The subject disclosure focuses on avoiding the huge size of the HARQ-ACK codebook and several solutions for PDSCH grouping for dynamic HARQ-ACK codebook determination are proposed for NR access on unlicensed spectrum (NR-U).

Figure 4:
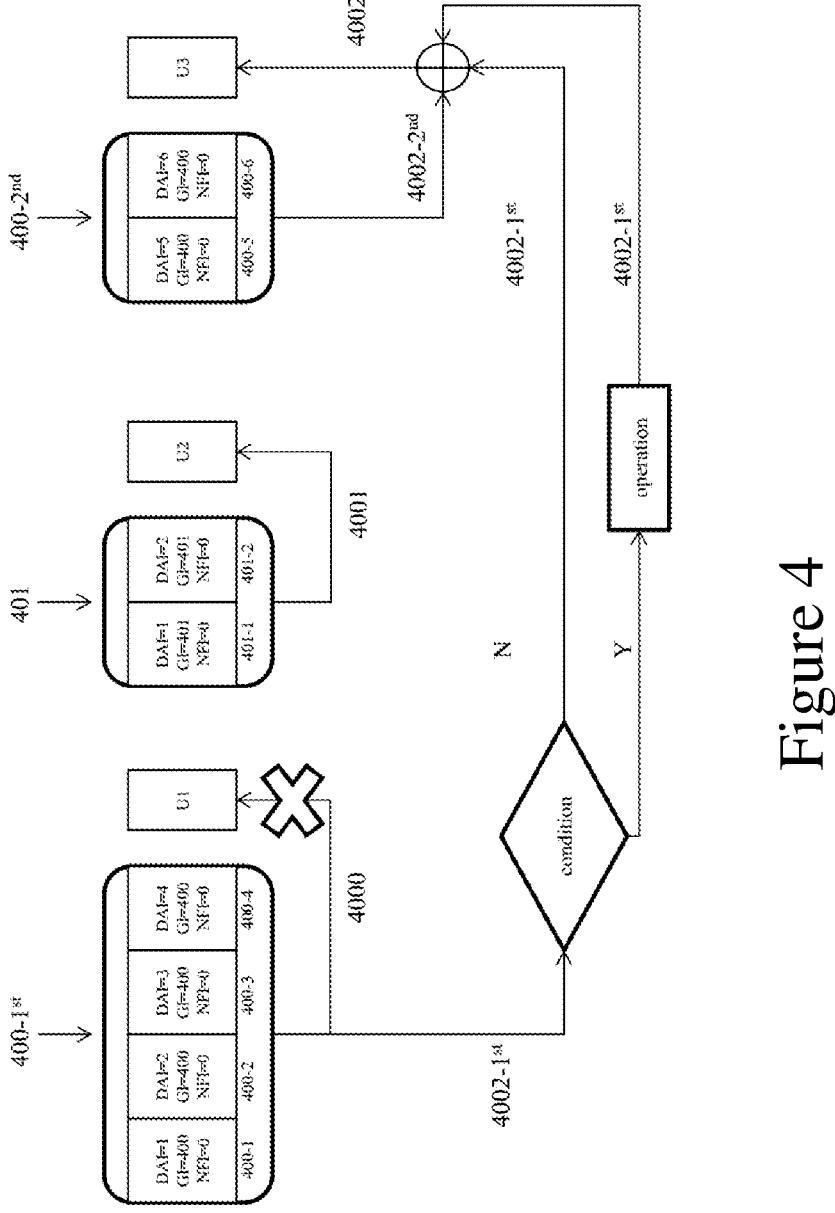
FIG. 4 illustrates one HARQ-ACK codebook determination for the same PDSCH group in one PUCCH according to a preferred embodiment of the subject disclosure.

FIG. 4 illustrates one HARQ-ACK codebook determination for the same PDSCH group in one PUCCH according to a preferred embodiment of the subject disclosure. In FIG. 4, the PDSCH group 400 includes two sub-groups: the first sub-group 400-1$^{st}$, which includes four PDSCHs, PDSCH 400-1, PDSCH 400-2, PDSCH 400-3, and PDSCH 400-4, and the second sub-group, 400-2$^{nd}$, which includes two PDSCHs, PDSCH 400-5 and PDSCH 400-6. The first sub-group 400-1$^{st}$ includes PDSCHs included in previous PDSCH group with the PDSCH group index 400 and the corresponding HARQ-ACK feedback is requested for retransmission, and the second sub-group 400-2$^{nd}$ includes PDSCHs newly scheduled in the same PDSCH group and the corresponding HARQ-ACK feedback is requested for initial transmission.

Therefore, the HARQ-ACK codebook 4002 includes two sub-codebooks: the first sub-codebook 4002-1$^{st}$ includes the retransmitted HARQ-ACK information bits for the first sub-group 400-1$^{st}$, and the second sub-codebook 4002-2$^{nd}$ includes the new HARQ-ACK information bits for the second sub-group 400-2$^{nd}$. The counter DAI and total DAI are accumulated from the first PDSCH sub-group to the second PDSCH sub-group, respectively. That is, the value of DAI for the PDSCH 400-1 to 400-6 is 1, 2, . . . , 6 respectively, and the value of the total DAI is 6.

In a preferred embodiment, the subject disclosure determines the size of the first sub-codebook before it is concatenated with the second sub-codebook. The maximum size of the first sub-codebook is configured by RRC signaling. If the size of the first sub-codebook 4002-1$^{st}$ is larger than the configured maximum size, namely, the result of the "condition" block in FIG. 4 is "Y", and then some operations need to be performed within the first sub-codebook 4002-1$^{st}$. If the size of the first sub-codebook 4002-1$^{st}$ is smaller than the configured maximum size, namely, the result of the "condition" block in FIG. 4 is "N", and then the first sub-codebook 4002-1$^{st}$ is concatenated with the second sub-codebook 4002-2$^{nd}$.

In one embodiment, the operation step in FIG. 4 includes reducing the size of the first sub-codebook 4002-1$^{st}$ by the UE according to the following predefined rules and orders from Rule 1-1 to Rule 1-4.

Rule 1-1: If the current size of the first sub-codebook is larger than the configured maximum size, CBG-based HARQ-ACK information bits for one TB is bundled to one HARQ-ACK information bits, i.e., from CBG-based HARQ-ACK information bits fallback to TB-based HARQ-ACK information bits in the first sub-codebook. In other words, performing logic AND operation to each HARQ-ACK information bit for a CBG of one TB. If any HARQ-ACK information bit for a CBG of the TB is 0 (i.e., NACK), then the HARQ-ACK information bit for the TB is 0. If each HARQ-ACK information bit for a CBG of the TB is 1 (i.e., ACK), the HARQ-ACK information bit for the TB is 1. In this way, the HARQ-ACK information bits of the first sub-codebook are reduced.

Rule 1-2: If the current size of the first sub-codebook is larger than the configured maximum size, spatial bundling is performed to generate one HARQ-ACK information bits for one PDSCH. Spatial bundling is performed by logic AND operation among the two TBs of one PDSCH. If any HARQ-ACK information bit for a TB is 0 (i.e., NACK), then the HARQ-ACK information bit for the PDSCH is 0. If each HARQ-ACK information bit for a TB is 1 (i.e., ACK), the HARQ-ACK information bit for the PDSCH is 1. In this way, the HARQ-ACK information bits of the first sub-codebook are reduced.

Rule 1-3: If the current size of the first sub-codebook is larger than the configured maximum size, time domain bundling is performed to generate one HARQ-ACK information bits for PDSCHs on same carrier. Time domain bundling is performed by logic AND operation among the PDSCHs within the first sub-group and on same carrier. If any HARQ-ACK information bit for a PDSCH is 0 (i.e., NACK), then the bundled HARQ-ACK information bit is 0. If each HARQ-ACK information bit for a PDSCH is 1 (i.e., ACK), the bundled HARQ-ACK information bit is 1. In this way, the HARQ-ACK information bits of the first sub-codebook are reduced.

Rule 1-4: If the current size of the first sub-codebook is larger than the configured maximum size, carrier domain bundling is performed to generate one HARQ-ACK information bits for multiple HARQ-ACK information bits for multiple carriers. Carrier domain bundling is performed by logic AND operation among the PDSCHs within the first sub-group and on configured multiple carriers. If any HARQ-ACK information bit for a PDSCH is 0 (i.e., NACK), then the bundled HARQ-ACK information bit is 0. If each HARQ-ACK information bit for a PDSCH is 1 (i.e., ACK), the bundled HARQ-ACK information bit is 1. In this way, the HARQ-ACK information bits of the first sub-codebook are reduced.

Alternatively, Rules 1-1-1-4 and the orders to perform these rules for HARQ-ACK bundling within the first sub-codebook $4002\text{-}1^{st}$ are configured by the BS. So HARQ-ACK bundling within the first sub-codebook is performed by the UE according to the rules and orders configured by the BS. For example, the BS can configure only Rule 1-1 and Rule 1-2, and indicate UE to perform Rule 1-2 before Rule 1-1. In conclusion, the four Rules could be configured by both the BS and the UE, with any order. The subject disclosure has no intention of limiting these rules or the order to perform these rules.

In another preferred embodiment, the maximum transmission number or retransmission number of the first sub-codebook $4002\text{-}1^{st}$ is configured by RRC signaling, and a corresponding transmission counter is maintained for each PDSCH group. When the current transmission number or retransmission number of the first sub-codebook $4002\text{-}1^{st}$ exceeds the configured maximum number, the UE may drop the sub-codebook $4002\text{-}1^{st}$ and merely transmitting the second sub-codebook $4002\text{-}2^{nd}$ to the BS.

Alternatively, when UE drops the sub-codebook $4002\text{-}1^{st}$ due to exceeding the maximum transmission number, the UE expects BS has same understating of the dropping operation. So the UE expects NFI is toggled and counter DAI is started from the minimum value, e.g., DAI=1 for the first newly scheduled PDSCH. This implies a new PDSCH group with same group index is scheduled without the retransmission of previous PDSCH group.

In some other embodiments, when the current transmission number or retransmission number of the first sub-codebook $4002\text{-}1^{st}$ is larger than the configured maximum number, the UE may perform the HARQ-ACK bundling within the first sub-codebook according to the above Rule 1-1 to Rule 1-4. After the HARQ-ACK bundling, the first sub-codebook may include a plurality of HARQ-ACK bit, and the plurality of HARQ-ACK bits are concatenated with the second sub-codebook and transmitted by UE. In particular, the first sub-codebook may only include one HARQ-ACK bit after the HARQ-ACK bundling operation. This implies UE performs logic AND operation among all the HARQ-ACK information bits of the first sub-codebook and obtains a single bit.

In another preferred embodiment, when the size of the first sub-codebook $4002\text{-}1^{st}$ is larger than the configured maximum size, a one-shot HARQ-ACK feedback is autonomously triggered. That is, the UE transmits the HARQ-ACK feedback for all the configured Downlink HARQ processes. In the one-shot HARQ-ACK codebook, the HARQ-ACK information bits are ordered based on the HARQ process ID and there is no sub-codebook for the one-shot HARQ-ACK codebook.

Alternatively, when the size of the HARQ-ACK codebook, which includes the first sub-codebook $4002\text{-}1^{st}$ and the second sub-codebook $4002\text{-}2^{nd}$, is larger than the configured maximum size, a one-shot HARQ-ACK feedback is autonomously triggered. That is, the UE transmits the HARQ-ACK feedback for all the configured Downlink HARQ processes. In the one-shot HARQ-ACK codebook, the HARQ-ACK information bits are ordered based on the HARQ process ID and there is no sub-codebook for the one-shot HARQ-ACK codebook.

In one preferred embodiment, the maximum size of the HARQ-ACK codebook is configured by RRC signaling. When the size of the HARQ-ACK codebook is larger than the configured maximum size, the UE may perform HARQ-ACK bundling within the HARQ-ACK codebook according to one or more predefined rules. Some examples of the rules are presented as follows:

Rule 2-1: If the current size of the HARQ-ACK codebook is larger than the configured maximum size, CBG-based HARQ-ACK information bits for one TB is bundled to one HARQ-ACK information bits, i.e., from CBG-based HARQ-ACK information bits fallback to TB-based HARQ-ACK information bits.

Rule 2-2: If the current size of the HARQ-ACK codebook is larger than the configured maximum size, spatial bundling is performed to generate one HARQ-ACK information bits for one PDSCH.

Rule 2-3: If the current size of the HARQ-ACK codebook is larger than the configured maximum size, time domain bundling is performed to generate one HARQ-ACK information bits for PDSCHs on same carrier.

Rule 2-4: If the current size of the HARQ-ACK codebook is larger than the configured maximum size, carrier domain bundling is performed to generate one HARQ-ACK information bits for multiple HARQ-ACK information bits for multiple carriers.

The rules and orders for HARQ-ACK bundling within the HARQ-ACK codebook may be configured by the BS, for instance, the BS can only configure Rule 2-1 and Rule 2-2, and may indicate UE to perform Rule 2-2 before Rule 2-1. The subject disclosure has no intention of limiting these rules or the order to perform these rules.

In another preferred embodiment, the maximum size of the HARQ-ACK codebook is configured by RRC signaling. When the size of the HARQ-ACK codebook is larger than the maximum size, the UE may perform HARQ-ACK bundling within the first sub-codebook according to one or more predefined rules. Some examples of the rules are presented as follows:

Rule 3-1: If the size of the current HARQ-ACK codebook is larger than the configured maximum size, within the first sub-codebook, e.g., the first sub-book $4002\text{-}1'$, CBG-based HARQ-ACK information bits for one TB is bundled to one HARQ-ACK information bits, i.e., from CBG-based HARQ-ACK information bits fall-back to TB-based HARQ-ACK information bits.

Rule 3-2: If the current HARQ-ACK codebook size is larger than the configured maximum size, within the first sub-codebook, spatial bundling is performed to generate one HARQ-ACK information bits for one PDSCH.

Rule 3-3: If the current HARQ-ACK codebook size is larger than the configured maximum size, within the first sub-codebook, time domain bundling is performed to generate one HARQ-ACK information bits for PDSCHs on same carrier.

Rule 3-4: If the current HARQ-ACK codebook size is larger than the configured maximum size, within the first sub-codebook, carrier domain bundling is performed to generate one HARQ-ACK information bits for multiple HARQ-ACK information bits for multiple carriers.

The rules and orders for HARQ-ACK bundling within the first sub-codebook may be configured by the BS, for instance, the BS can only configure Rule 3-1 and Rule 3-2, and may indicate UE to perform Rule 3-2 before Rule 3-1. The subject disclosure has no intention of limiting these rules or the order to perform these rules.

Figure 5:
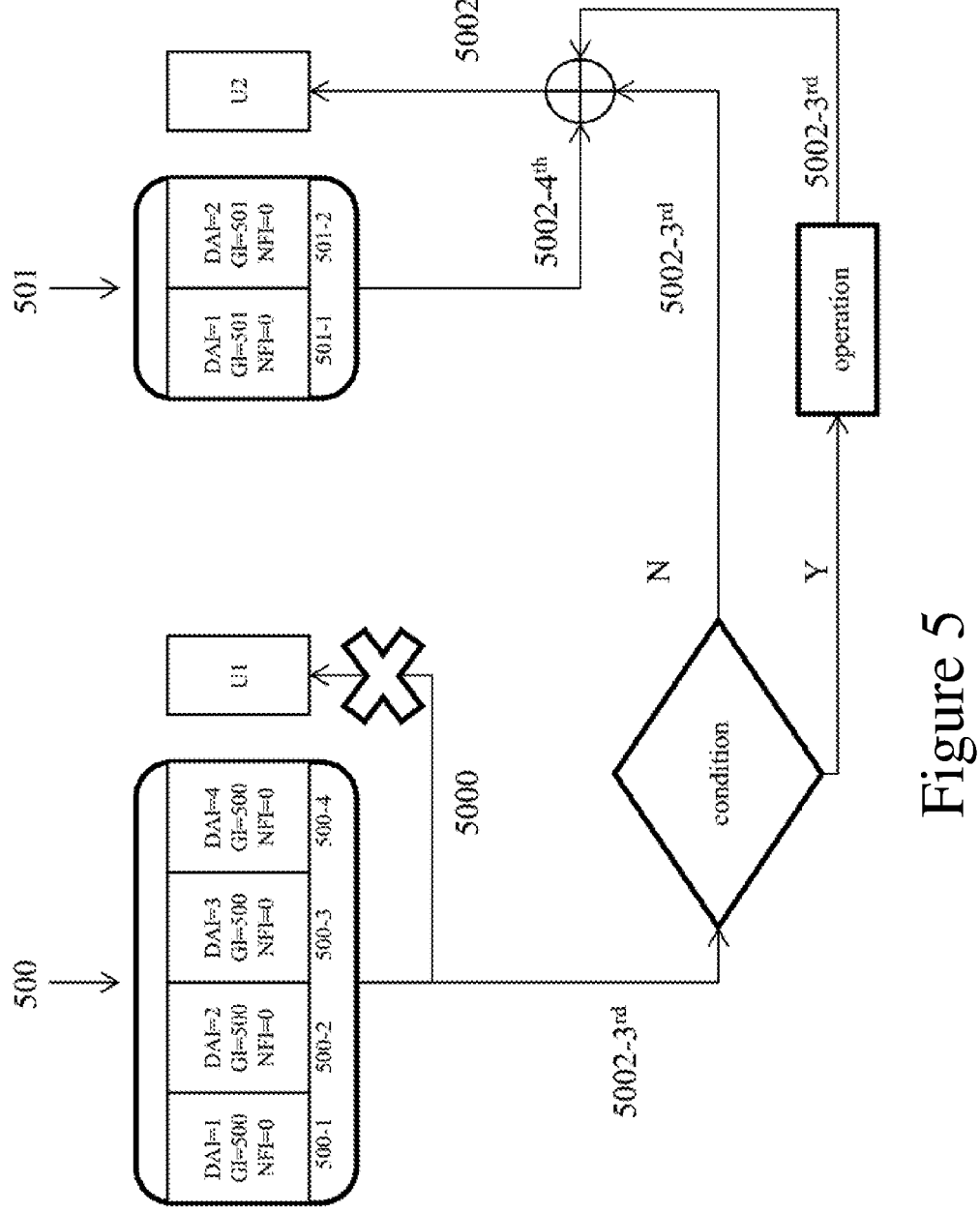
FIG. 5 illustrates one HARQ-ACK codebook determination for two PDSCH groups in one PUCCH according to a preferred embodiment of the subject disclosure.

FIG. 5 illustrates one HARQ-ACK codebook determination for two PDSCH groups in one PUCCH according to a preferred embodiment of the subject disclosure. In FIG. 5, the PDSCH group 500 includes four PDSCHs, PDSCH 500-1, 500-2, 500-3, and 500-4. The PDSCH group 501 includes two PDSCHs, PDSCH 501-1 and PDSCH 501-2.

The BS transmits a DCI to request the HARQ-ACK feedback for the two PDSCH groups, PDSCH groups 500 and 501, in the same PUCCH.

Therefore, the HARQ-ACK codebook 5002 includes two sub-codebooks: the third sub-codebook $5002\text{-}3^{rd}$ includes the retransmitted HARQ-ACK information bits for the PDSCH group 500, and the fourth sub-codebook $5002\text{-}4^{th}$ includes the new HARQ-ACK information bits for the PDSCH group 501. The counter DAI and total DAI are accumulated within the PDSCH group 500 and the PDSCH group 501. For example, the counter DAI in both PDSCH group 500 and 501 starts from 1. It should be noted that there is no first and second sub-codebook in the HARQ-ACK codebook 5002 in FIG. 5, and the third and the fourth sub-codebooks are merely named to distinct from the first and second sub-codebook in FIG. 4.

The third sub-group $5002\text{-}3^{rd}$ includes PDSCHs included in previous PDSCH group with the group index 500 and the corresponding HARQ-ACK feedback is requested for retransmission, and the fourth sub-group $5002\text{-}4^{th}$ includes PDSCHs currently scheduled in a different PDSCH group with the group index 501 and the corresponding HARQ-ACK feedback is requested for initial transmission.

It should be noted that if the $3^{rd}$ sub-codebook and the $4^{th}$ sub-codebook corresponds to the same PDSCH group, the technical solution in FIG. 5 is similar to that in FIG. 4, where the $1^{st}$ sub-codebook and the $2^{nd}$ sub-codebook correspond to the same PDSCH group.

There are several technical solutions for requesting the retransmission of the third sub-codebook, $5002\text{-}3^{rd}$. In one embodiment, the BS uses a dedicated DCI which is not for DL scheduling or UL scheduling, to request the HARQ-ACK feedback for one or more PDSCH groups. The dedicated DCI includes a bitmap indicating the requested one or more PDSCH groups. The dedicated DCI also includes the size of the sub-codebook for each PDSCH group for reliability. Alternatively, the size of the sub-codebook for each PDSCH group may also be configured by RRC signaling.

When the size of the sub-codebook is smaller than the configured sub-codebook size, padding bits (e.g., NACK bits) are appended to align the configured sub-codebook size. When the size of the sub-codebook is larger than the configured sub-codebook size, HARQ-ACK bundling within each sub-codebook is performed by the UE according to the predefined or configured rules and orders so as to align the configured sub-codebook size. For example, the UE may perform HARQ-ACK bundling according to Rules 1-1 to Rules 1-4.

In another embodiment, the BS uses a DCI for DL scheduling which includes two bits to jointly indicate the index of the scheduled PDSCH group or groups. For example, the two bits has the value of "00" indicates only PDSCH group 500 is scheduled; "01" indicates only group 501 is scheduled; "10" indicates PDSCH group 500 is scheduled and HARQ-ACK feedback for group 501 is requested and transmitted in the same HARQ-ACK codebook along with HARQ-ACK feedback for PDSCH group 500; "11" indicates PDSCH group 501 is scheduled and HARQ-ACK feedback for PDSCH group 500 is requested and transmitted in the same HARQ-ACK codebook with HARQ-ACK feedback for PDSCH group 501. The meanings of the two bits could also be configured to indicate other scheduling manners. The subject disclosure has no intention of limiting the meanings of the two bits.

In a preferred embodiment, the subject disclosure determines the size of the third sub-codebook before it is concatenated with the fourth sub-codebook. The maximum size of the third sub-codebook is configured by RRC signaling. If the size of the third sub-codebook $5002\text{-}3^{rd}$ is larger than the configured maximum size, namely, the "condition" block in FIG. 5 is satisfied, and then some operations need to be performed within the third sub-codebook $5002\text{-}3^{rd}$.

In one embodiment, the operation step in FIG. 5 includes reducing the size of the third sub-codebook $5002\text{-}3^{rd}$ by the UE according to the predefined rules and orders. For example, the UE may perform HARQ-ACK bundling according to the above Rule 1-1 to Rule 1-4. After the HARQ-ACK bundling, the third sub-codebook may include a plurality of HARQ-ACK bit, and the plurality of bundled bits are concatenated with the fourth sub-codebook and transmitted by UE. In particular, the third sub-codebook may only include one HARQ-ACK bit after the HARQ-ACK bundling operation. This implies UE performs logic AND operation among all the HARQ-ACK information bits of the third sub-codebook and obtains a single bit.

In another embodiment, when the size of the third sub-codebook $5002\text{-}3^{rd}$ is larger than the configured maximum size, a one-shot HARQ-ACK feedback is autonomously triggered. That is, the UE transmits the HARQ-ACK feedback for all the configured Downlink HARQ processes. In the one-shot HARQ-ACK codebook, the HARQ-ACK information bits are ordered based on the HARQ process ID and there is no sub-codebook for the one-shot HARQ-ACK codebook. Alternatively, when the size of the HARQ-ACK codebook, which includes the third sub-codebook $5002\text{-}3^{rd}$ and the fourth sub-codebook $5002\text{-}4^{th}$, is larger than the configured maximum size, a one-shot HARQ-ACK feedback is autonomously triggered.

In one preferred embodiment, the maximum HARQ-ACK codebook size is configured by RRC signaling. When the size of the HARQ-ACK codebook is larger than the maximum size, the UE may perform HARQ-ACK bundling within the HARQ-ACK codebook according to one or more predefined rules. For example, Rule 2-1 to Rule 2-4.

In another preferred embodiment, the maximum size of the HARQ-ACK codebook is configured by RRC signaling. When the size of the HARQ-ACK codebook is larger than the maximum size, the UE may perform HARQ-ACK bundling within the third sub-codebook according to one or more predefined rules. For example, Rule 3-1 to Rule 3-4.

After processing the third sub-codebook $5002\text{-}3^{rd}$, the BS concatenates the third sub-codebook $5002\text{-}3^{rd}$ and the fourth sub-codebook $5002\text{-}4^{th}$ into the final HARQ-ACK codebook 5002. The third sub-codebook $5002\text{-}3^{rd}$ and the fourth sub-codebook $5002\text{-}4^{th}$ may be ordered in an increasing order of the corresponding PDSCH group index, e.g., the sub-codebook for the PDSCH group with smaller group index is placed firstly then appended by the another sub-codebook, or vice versa. Alternatively, the BS may place the third sub-codebook $5002\text{-}3^{rd}$ firstly, then place the 4th sub-codebook, or vice versa.

Figure 6:
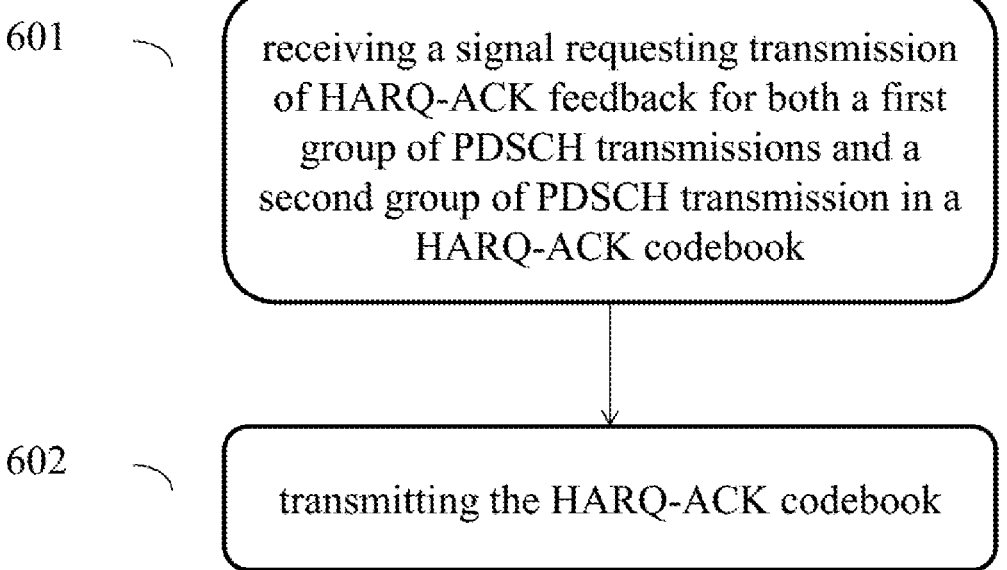
FIG. 6 illustrates a method performed by a UE for wireless communication according to a preferred embodiment of the subject disclosure.

FIG. 6 illustrates a method performed by a UE for wireless communication according to a preferred embodiment of the subject disclosure. In step 601, the UE (e.g., UE 101 as shown in FIG. 1) receives a signal, for example, DCI, requesting transmission of HARQ-ACK feedback for both a first group of PDSCH transmissions and a second group of PDSCH transmission in a HARQ-ACK codebook. For example, the first group $400\text{-}1^{st}$ and the second group $400\text{-}2^{nd}$ in FIG. 4, and the first group 500 and the second group 501 in FIG. 5. In step 602, the UE transmits the HARQ-ACK codebook to the BS.

Figure 7:
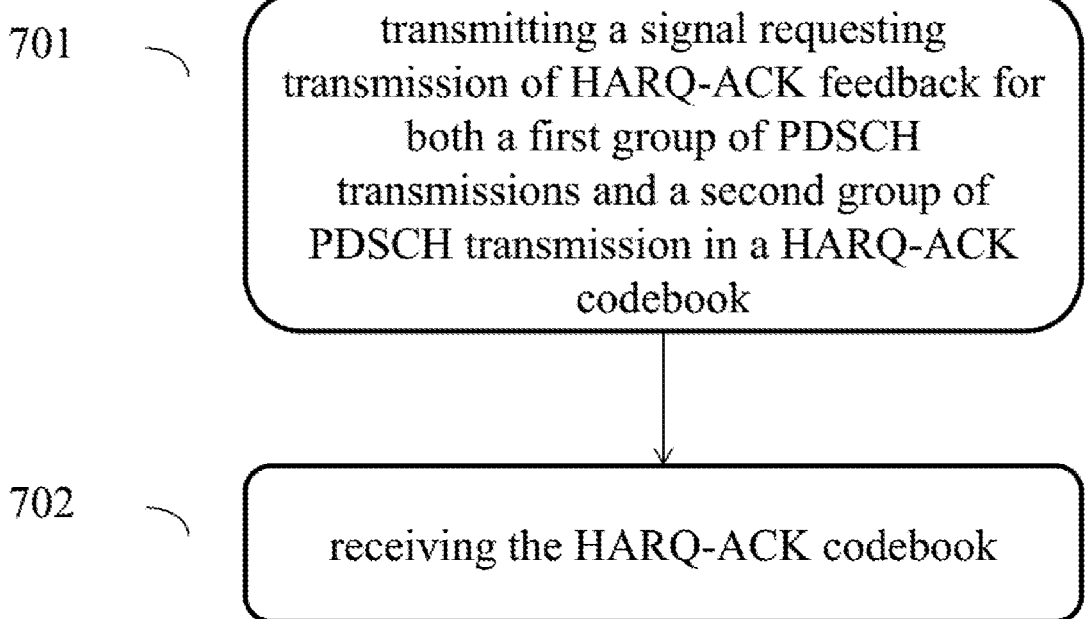
FIG. 7 illustrates a method performed by a BS for wireless communication according to a preferred embodiment of the subject disclosure.

FIG. 7 illustrates a method performed by a BS for wireless communication according to a preferred embodiment of the subject disclosure. In step 701, the BS (e.g., BS 102 as shown in FIG. 1) transmits a signal, for example, DCI, requesting transmission of HARQ-ACK feedback for both a first group of PDSCH transmissions and a second group of PDSCH transmission in a HARQ-ACK codebook. In step 602, the BS receives the HARQ-ACK codebook.

In FIG. 4, the first group $400\text{-}1^{st}$ has associated DCI which indicates the first group index is 400, and the second group $400\text{-}2^{nd}$ also has associated DCI which indicates the second group index is 400. In FIG. 5, the first group 500 has associated DCI which indicates the first group index is 500, and the second group 501 has associated DCI which indicates the second group index is 501.

The HARQ-ACK codebook consists of two sub-codebooks: a first sub-codebook corresponding to the first group of PDSCH transmissions and a second sub-codebook corresponding to the second group of PDSCH transmission. For example, in FIG. 4, the HARQ-ACK codebook 4002 includes the first sub-codebook $4002\text{-}1^{st}$ which correspond to the PDSCH group $400\text{-}1^{st}$, and the second sub-codebook $4002\text{-}2^{nd}$ which correspond to the PDSCH group $400\text{-}2^{nd}$.

In one embodiment, the maximum size of the first sub-codebook is predefined, if the size of the first sub-codebook, e.g., $4002\text{-}1^{st}$ is larger than the maximum size, then the UE performs HARQ-ACK bundling within the first sub-codebook, to reduce the size of the first sub-codebook. Alternatively, the maximum transmission number or maximum retransmission number of the first sub-codebook is predefined, when the transmission number or retransmission number of the first sub-codebook, e.g., $4002\text{-}1^{st}$ exceeds the threshold, the first sub-codebook, e.g., $4002\text{-}1^{st}$ dropped, or the size of the first sub-codebook is reduced by the UE by performing HARQ-ACK bundling according to one or more predefined rules, for example, the Rules 1-1 to 1-4.

In one embodiment, if a size of a first sub-codebook is larger than a predefined maximum size, the HARQ-ACK codebook includes HARQ-ACK feedback for all downlink HARQ processes. For example, if the first sub-codebook in FIG. 2 is larger than the maximum size defined by RRC signaling, the UE transmits the HARQ-ACK feedback for all the configured Downlink HARQ processes. Alternatively, if the size of the HARQ-ACK codebook, e.g. HARQ-ACK codebook 2002 in FIG. 2, is larger than a predefined maximum size, the HARQ-ACK codebook includes HARQ-ACK feedback for all downlink HARQ processes.

In a preferred embodiment, if the size of the HARQ-ACK codebook, e.g. HARQ-ACK codebook 2002 in FIG. 2, is larger than a predefined maximum size, the UE would perform HARQ-ACK bundling within the HARQ-ACK codebook according to one or more predefined rules, for example, Rules 2-1 to 2-4. Alternatively, the UE would perform HARQ-ACK bundling within the first sub-codebook according to one or more predefined rules, for example, Rules 3-1 to 3-4.

The third sub-codebook $500\text{-}3^{rd}$ and the fourth sub-codebook $500\text{-}4^{th}$ may be arranged in the HARQ-ACK codebook according to the group index 500 and 501, for example, the sub-codebook with smaller group index is placed first.

In one embodiment, the first group of PDSCH transmission, e.g., PDSCH group $400\text{-}1^{st}$ in FIG. 4, is transmitted earlier than the second group of PDSCH transmissions, e.g., PDSCH group $400\text{-}2^{nd}$ in FIG. 4. The HARQ-ACK feedback for the PDSCH group $400\text{-}1^{st}$ is already transmitted, and the HARQ-ACK feedback for the PDSCH group $400\text{-}2^{nd}$ has not been transmitted. The first sub-codebook $4002\text{-}1^{st}$ includes HARQ-ACK information bits for the first PDSCH group $400\text{-}1^{st}$ to be retransmitted, the second sub-codebook $4002\text{-}2^{nd}$ includes HARQ-ACK information bits for the first PDSCH group $400\text{-}2^{nd}$ to be transmitted for the first time.

In one embodiment of the subject disclosure, the DCI schedules one PDSCH transmission of the second PDSCH group, e.g., PDSCH group $400\text{-}2^{nd}$ in FIG. 4, and the DCI include a signal indicating HARQ-ACK feedback for the first PDSCH group, e.g., PDSCH group $400\text{-}1^{st}$, is requested. The group index of PDSCH group $400\text{-}1^{st}$ and that of PDSCH group $400\text{-}2^{nd}$ are identical. The DCI also indicates a DAI, and the value of the DAI is accumulated from the first PDSCH group 400-1$^{st}$ to the second PDSCH group 400-2$^{nd}$.

In another embodiment of the subject disclosure, the DCI schedules one PDSCH transmission of the second PDSCH group, e.g., PDSCH group 501 in FIG. 5, and the DCI include a signal indicating HARQ-ACK feedback for the first PDSCH group, e.g., PDSCH group 500, is requested. The group index of PDSCH group 500 and that of PDSCH group 501 are different. The DCI also indicates a DAI, and the value of the DAI is accumulated within the first PDSCH group 500 and the second PDSCH group 501.

In another embodiment, the DCI includes a bitmap with each bit corresponding to one PDSCH group, and the bitmap indicates whether HARQ-ACK feedback for the corresponding PDSCH group is requested or not. The DCI further indicates a size of codebook for the first group and a size of codebook for the second group.

In another embodiment, the DCI includes a signal to indicate the index of the scheduled PDSCH group, e.g., PDSCH group 501 in FIG. 5, and the index of another requested PDSCH group, e.g., PDSCH group 500 in FIG. 5, in response to HARQ-ACK feedback for another group is requested. The DCI schedules one PDSCH transmission of the PDSCH group 501 and the DCI further requests HARQ-ACK feedback for the PDSCH group 500.

Figure 8:
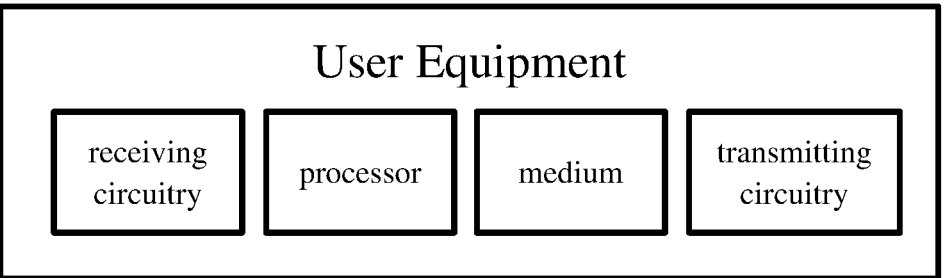
FIG. 8 illustrates a block diagram of a UE according to the embodiments of the present disclosure.

FIG. 8 illustrates a block diagram of a UE according to the embodiments of the present disclosure. The UE 101 may include a receiving circuitry, a processor, and a transmitting circuitry. In one embodiment, the UE 101 may include a non-transitory computer-readable medium having stored thereon computer-executable instructions; a receiving circuitry; a transmitting circuitry; and a processor coupled to the non-transitory computer-readable medium, the receiving circuitry and the transmitting circuitry. The computer executable instructions can be programmed to implement a method (e.g. the method in FIG. 6) with the receiving circuitry, the transmitting circuitry and the processor. That is, upon performing the computer executable instructions, the receiving circuitry may receive, a signal requesting transmission of ARQ-ACK feedback for both a first group of PDSCH transmissions and a second group of PDSCH transmission in a HARQ-ACK codebook, and the transmitting circuitry may transmit, the HARQ-ACK codebook.

Figure 9:
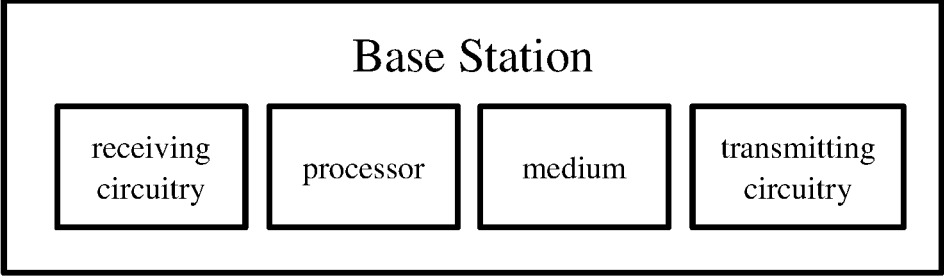
FIG. 9 illustrates a block diagram of a BS according to the embodiments of the present disclosure.

FIG. 9 illustrates a block diagram of a BS according to the embodiments of the present disclosure. The BS 102 may include a receiving circuitry, a processor, and a transmitting circuitry. In one embodiment, the BS may include a non-transitory computer-readable medium having stored thereon computer-executable instructions; a receiving circuitry; a transmitting circuitry; and a processor coupled to the non-transitory computer-readable medium, the receiving circuitry and the transmitting circuitry. The computer executable instructions can be programmed to implement a method (e.g. the method in FIG. 7) with the receiving circuitry, the transmitting circuitry and the processor. That is, upon performing the computer executable instructions, the transmitting circuitry may transmit, a signal requesting transmission of HARQ-ACK feedback for both a first group of PDSCH transmissions and a second group of PDSCH transmission in a HARQ-ACK codebook, and then the receiving circuitry may receive the HARQ-ACK codebook.

The method of the present disclosure can be implemented on a programmed processor. However, the controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device that has a finite state machine capable of implementing the flowcharts shown in the figures may be used to implement the processing functions of the present disclosure.

While the present disclosure has been described with specific embodiments thereof, it is evident that many alternatives, modifications, and variations will be apparent to those skilled in the art. For example, various components of the embodiments may be interchanged, added, or substituted in the other embodiments. Also, all of the elements shown in each figure are not necessary for operation of the disclosed embodiments. For example, one skilled in the art of the disclosed embodiments would be capable of making and using the teachings of the present disclosure by simply employing the elements of the independent claims. Accordingly, the embodiments of the present disclosure as set forth herein are intended to be illustrative, not limiting. Various changes may be made without departing from the spirit and scope of the present disclosure.

In this disclosure, relational terms such as "first," "second," and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising."

What is claimed is:

1. A method performed by a user equipment (UE), the method comprising:

receiving a first downlink control information (DCI) indicating a first group index associated with respective first physical downlink shared channel (PDSCH) transmissions of a first group of PDSCH transmissions;

receiving a second DCI indicating a second group index associated with respective second PDSCH transmissions of a second group of PDSCH transmissions, wherein the second DCI schedules a PDSCH transmission of the second group of PDSCH transmissions, and wherein the second DCI comprises a field with two bits that indicates whether a transmission of first hybrid automatic repeat request-acknowledgement (HARQ-ACK) feedback associated with the first group of PDSCH transmissions and second HARQ-ACK feedback associated with the second group of PDSCH transmissions in a HARQ-ACK codebook is requested; and transmitting the HARQ-ACK codebook.

2. The method of claim 1, wherein the HARQ-ACK codebook comprises a first sub-codebook corresponding to the first group of PDSCH transmissions and a second sub-codebook corresponding to the second group of PDSCH transmissions.

3. The method of claim 2, further comprising reducing a size of the first sub-codebook by performing HARQ-ACK bundling within the first sub-codebook according to one or more predefined rules based at least in part on at least one of the size of the first sub-codebook being greater than a first maximum size or a size of the HARQ-ACK codebook being greater than a second maximum size.

4. The method of claim 2, further comprising reducing or dropping the first sub-codebook by performing HARQ-ACK bundling within the first sub-codebook according to one or more predefined rules based at least in part on at least one of a (re) transmission number of the first sub-codebook being greater than a predefined maximum (re) transmission number.

5. A user equipment (UE) for wireless communication, comprising:

at least one memory; and at least one processor coupled with the at least one memory and configured to cause the UE to:

receive a first downlink control information (DCI) indicating a first group index associated with respective first physical downlink shared channel (PDSCH) transmissions of a first group of PDSCH transmissions;

receive a second DCI indicating a second group index associated with respective second PDSCH transmissions of a second group of PDSCH transmissions, wherein the second DCI schedules a PDSCH transmission of the second group of PDSCH transmissions, and wherein the second DCI comprises a field with two bits that indicates whether a transmission of first hybrid automatic repeat request-acknowledgement (HARQ-ACK) feedback associated with the first group of PDSCH transmissions and second HARQ-ACK feedback associated with the second group of PDSCH transmissions in a HARQ-ACK codebook is requested; and transmit the HARQ-ACK codebook.

6. The UE of claim 5, wherein the HARQ-ACK codebook comprises HARQ-ACK feedback for all downlink hybrid automatic repeat request (HARQ) processes in response to a size of a first sub-codebook being greater than a predefined maximum size, wherein the first sub-codebook comprises HARQ-ACK information bits for the first group of PDSCH transmissions.

7. The UE of claim 5, wherein the HARQ-ACK codebook comprises HARQ-ACK feedback for all downlink hybrid automatic repeat request (HARQ) processes in response to a size of the HARQ-ACK codebook being greater than a predefined maximum size.

8. The UE of claim 5, wherein the at least one processor is further configured to cause the UE to reduce a size of the HARQ-ACK codebook by performing HARQ-ACK bundling within the HARQ-ACK codebook according to one or more predefined rules based at least in part on the size of the HARQ-ACK codebook being larger than a predefined maximum size.

9. The UE of claim 5, wherein the HARQ-ACK codebook comprises a first sub-codebook and a second sub-codebook, and wherein the first sub-codebook and the second sub-codebook are arranged in the HARQ-ACK codebook according to the first group index and the second group index.

10. The UE of claim 9, wherein the first group of PDSCH transmissions comprises PDSCH transmission(s) with corresponding HARQ-ACK feedback that has been transmitted, and wherein the second group of PDSCH transmissions comprises PDSCH transmission(s) with corresponding HARQ-ACK feedback that has not been transmitted.

11. The UE of claim 5, wherein the first group index and the second group index are identical.

12. The UE of claim 11, wherein the second DCI indicates a downlink assignment index, and wherein a value of the downlink assignment index is accumulated for each PDSCH transmission from the first group of PDSCH transmissions to the second group of PDSCH transmissions.

13. The UE of claim 5, wherein the first group index and the second group index are different.

14. The UE of claim 13, wherein the second DCI indicates a downlink assignment index, and wherein a value of the downlink assignment index is accumulated for each PDSCH transmission within respective groups of PDSCH transmissions.

15. The UE of claim 5, wherein at least one of the first DCI or the second DCI indicates a size of a codebook for the first group of PDSCH transmissions and a size of a codebook for the second group of PDSCH transmissions.

16. The UE of claim 5, wherein the second DCI indicates an index of a scheduled group of PDSCH transmissions and an index of an additional group of PDSCH transmissions in response to HARQ-ACK feedback for the additional group of PDSCH transmissions being requested.

17. The UE of claim 16, wherein the field requests the transmission of both the first HARQ-ACK feedback and the second HARQ-ACK feedback.

18. The UE of claim 5, wherein the HARQ-ACK codebook comprises a first sub-codebook corresponding to the first group of PDSCH transmissions and a second sub-codebook corresponding to the second group of PDSCH transmissions.

19. A network equipment (NE) for wireless communication, comprising:

at least one memory; and at least one processor coupled with the at least one memory and configured to cause the NE to:

transmit a first downlink control information (DCI) indicating a first group index associated with respective first physical downlink shared channel (PDSCH) transmissions of a first group of PDSCH transmissions;

transmit a second DCI indicating a second group index associated with respective second PDSCH transmissions of a second group of PDSCH transmissions, wherein the second DCI schedules a PDSCH transmission of the second group of PDSCH transmissions, and wherein the second DCI comprises a field with two bits that indicates whether a transmission of first hybrid automatic repeat request-acknowledgement (HARQ-ACK) feedback associated with the first group of PDSCH transmissions and second HARQ-ACK feedback associated with the second group of PDSCH transmissions in a HARQ-ACK codebook is requested; and receive the HARQ-ACK codebook.

20. A method performed by a network equipment (NE), the method comprising:

transmit a first downlink control information (DCI) indicating a first group index associated with respective first physical downlink shared channel (PDSCH) transmissions of a first group of PDSCH transmissions;

transmit a second DCI indicating a second group index associated with respective second PDSCH transmissions of a second group of PDSCH transmissions, wherein the second DCI schedules a PDSCH transmission of the second group of PDSCH transmissions, and wherein the second DCI comprises a field with two bits that indicates whether a transmission of first hybrid automatic repeat request-acknowledgement (HARQ-ACK) feedback associated with the first group of PDSCH transmissions and second HARQ-ACK feedback associated with the second group of PDSCH transmissions in a HARQ-ACK codebook is requested; and receive the HARQ-ACK codebook.

\* \* \* \* \*